July 9, 1929.                C. C. FARMER                1,720,268
                           VARIABLE LOAD BRAKE
                            Filed Oct. 3, 1927
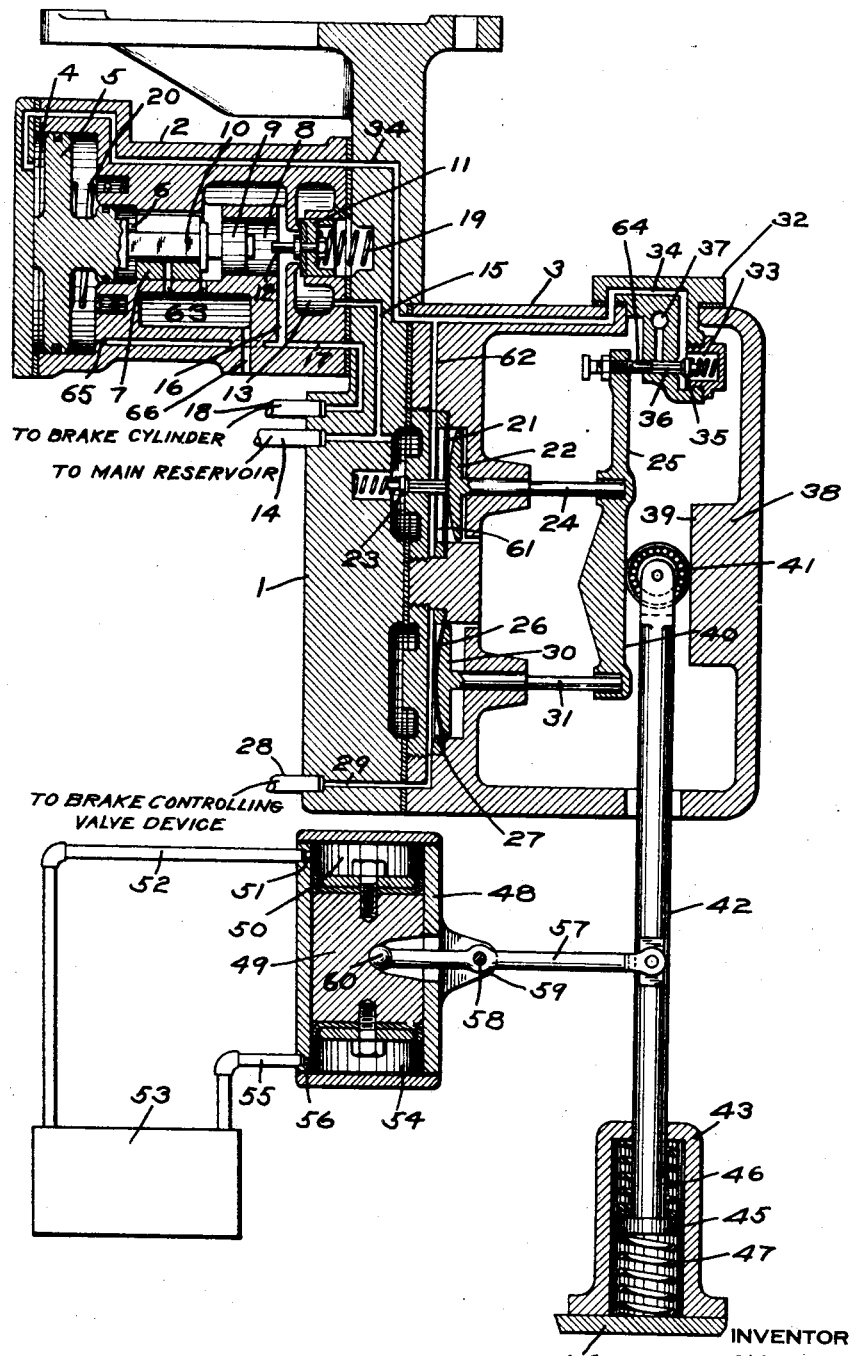
INVENTOR
CLYDE C. FARMER
BY
*Wm. M. Cady*
ATTORNEY Patented July 9, 1929.

1,720,268

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

VARIABLE-LOAD BRAKE.

Application filed October 3, 1927. Serial No. 223,533.

This invention relates to fluid pressure brakes, and more particularly to a brake equipment in which the braking pressure is varied according to the load on the car.

It has heretofore been proposed to provide a variable load brake equipment in which the apparatus is adjusted for the load on the car only at a time when the car is not running, in order to avoid the undesired and unintentional adjustment due to the jolting of the car when running along the road.

In some cases, such as on locomotive tenders, the load varies while the tender is running, as coal and water carried by the tender is consumed, and in such cases it is desirable to adjust the variable load brake apparatus according to the load while the car is running.

It is therefore the principal object of my invention to provide a variable load brake apparatus in which the apparatus is adjusted continually according to the varying load on the car, but which is not affected by jolting and vibratory movement between the car body and the truck.

In the accompanying drawing, the single figure is a diagrammatic sectional view of a variable load brake apparatus embodying my invention.

According to one embodiment of my invention, the apparatus may comprise a base section 1 adapted to be secured to the vehicle body, a relay valve device 2, secured to the base section 1, and an adjusting mechanism 3, also secured to the section 1.

The relay valve device 2 may comprise a casing having a piston chamber 4 containing a piston 5, a valve chamber 6 containing a slide valve 7, and a piston chamber 8, containing a small piston 9, which is connected to the stem 10 of piston 5. In axial alinement with the piston 9 is a piston guided valve 11 having a stem 12 adapted to be engaged by the piston 9 upon inward movement thereof. The valve 11 is contained in a valve chamber 13 which is connected to a source of fluid under pressure, such as the main reservoir (not shown) through pipe 14 and passage 15.

The valve chamber 6 and the piston chamber 8 are connected through passages 16 and 17 and pipe 18 with the usual brake cylinder (not shown). A spring 19 urges the valve 11 to its seat and a spring 20 urges the piston 5 to its outer position, as shown in the drawing.

The adjusting mechanism 3 may comprise a casing containing a flexible diaphragm 21 having a follower head 22 engaging one side thereof and having the stem of a valve 23 engaging the opposite side. The follower head 22 is provided with an outwardly projecting stem 24, the outer end of which engages in a socket of a fulcrum plate 25. The casing of the mechanism 3 also contains a flexible diaphragm 26 having the chamber 27 at one side connected to the usual triple or other brake controlling valve device (not shown) by way of pipe 28 and passage 29.

A follower head 30 engages the opposite side of the diaphragm 26 and is provided with a stem 31 adapted to engage in a socket of the fulcrum plate 25. Secured to the casing and extending through an opening therein is a release valve casing 32 having a valve chamber 33 connected to a passage 34 leading to piston chamber 4 and containing a valve 35.

The valve 35 is provided with a stem 36, adapted to engage the end of an adjustable rod 64 having a threaded portion engaging in a threaded opening of the fulcrum plate 25, and said valve controls communication from passage 34 to an atmospheric exhaust port 37.

A raised section 38 is provided in the casing having a bearing face 39 which is disposed adjacent to a bearing face 40 of the fulcrum plate 25 and disposed between and engaging said faces is a roller 41. The roller 41 is carried at one end of a rod 42, the other end extending into a casing 43 which is secured to a portion of the truck, as to the sand plank 44. The lower end of the rod 42 is provided with a head 45 and a coil spring 46 engages one side of the head, while a coil spring 47 engages the opposite side.

Adjacent to the rod 42 there is provided a cylinder 48 containing a double headed piston 49, the piston chamber 50 at one side of the piston being connected through a restricted port 51 and a pipe 52 with a reservoir 53 and piston chamber 54 at the opposite side of the piston being connected to said reservoir through pipe 55 and restricted port 56.

A lever 57 fulcrumed on a pin 58 carried by a lug 59 of the cylinder 48 has one end pivotally connected to the rod 42 and the other end provided with a bearing section 60 which engages in a recess provided in the piston 49.

The reservoir 53 is filled with a suitable liquid, which also fills the piston chambers 50 and 54, so that movement of the piston 49 in either direction causes liquid to be forced out of one of the piston chambers through a restricted port to the reservoir 53 and from the reservoir through a restricted port to the other piston chamber. The device therefore operates as a dash pot to resist movement of the lever 57 in either direction by the movement of the rod 42. Movement of the rod 42 is also resisted by the springs 46 and 47.

As the load on the vehicle is increased, the vehicle springs are compressed to an amount proportional to the increase in the load and the corresponding movement of the vehicle body relative to the truck causes the roller 41 to assume a corresponding position relative to the adjusting mechanism 3.

The springs 46 and 47 prevent jolting and vibratory movements from being transmitted to the rod 42, while the dash pot action of piston 49 tends to hold the rod 42 in its position of adjustment as effected by the load on the vehicle.

The roller 41 is thus maintained in a position of vertical adjustment corresponding with the load and when an application of the brakes is made, fluid under pressure is supplied from the triple or other brake controlling valve device through pipe 28 and passage 29 to the diaphragm chamber 27. The diaphragm 26 is then moved so that the stem 31 acts to tilt the fulcrum plate 25 with the roller 41 acting as a fulcrum. This tilting movement is then transmitted through the stem 24 to the diaphragm 21 and the diaphragm 21 is moved to effect the opening of valve 23. Fluid under pressure is then supplied from the main reservoir through pipe 14 and past the valve 23 to the diaphragm chambers 61 and thence through passages 62 and 34 to piston chamber 4. Piston 5 is then shifted toward the right, moving the valve 7 so as to blank the ports 63 and then operating to unseat the valve 11. This movement of the fulcrum plate 25 also permits the valve 35 to be moved to its seat, so as to cut off communication from passage 34 to the exhaust port 37. With the valve 11 unseated, fluid under pressure is supplied from the main reservoir, through pipe 14, passage 15, and valve chamber 13, past the valve 11 to the brake cylinder through passages 16 and 17 and pipe 18.

When the pressure in the diaphragm chamber 61 has been increased sufficiently to overcome the opposing pressure acting in diaphragm chamber 27, dependent upon the position of the fulcrum roller 41 the diaphragm 21 will be shifted to the right, permitting the valve 23 to seat.

The pressure in diaphragm chamber 61 and in piston chamber 4 is consequently not further increased and when the pressure of fluid supplied to the brake cylinder has been increased to a degree slightly exceeding the pressure of fluid acting in piston chamber 4, the piston 5 will be shifted to the left sufficiently to permit the valve 11 to seat and thus cut off the further supply of fluid to the brake cylinder, brake cylinder pressure being supplied to the chamber at the opposite side of the piston through passage 17 and a restricted port 65.

It will thus be seen that the degree of pressure attained in the brake cylinder is proportional to the load on the vehicle.

When the brakes are released, the triple or other brake controlling valve device operates to release fluid from the pipe 28 and from the diaphragm chamber 27. This permits movement of the diaphragm 26 to the left by the action of the pressure in diaphragm chamber 61. The release valve 35 is then unseated, so that fluid under pressure is vented from piston chamber 4 and the piston 5 is shifted to release position, in which the ports 63 are connected to valve chamber 6. Fluid in the brake cylinder is then vented to the atmosphere through passage 17 and valve chamber 6 to the atmospheric exhaust port 66.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a variable load brake, the combination with means for varying the braking power as the load on the vehicle varies including a vertically disposed rod movable vertically by the vehicle truck and relatively to the vehicle body, a fulcrum roller carried at one end of said rod, a yielding resistance element associated with the other end of said rod for transmitting relative movement in one direction to said rod, and a yielding resistance element also associated with said other end of the rod for transmitting relative movement in the opposite direction to said rod.

2. A variable load brake including a member movable by the vehicle truck and relatively to the vehicle body, a yielding resistance element for transmitting relative movement to said member, and means for dampening the movement of said member.

3. A variable load brake including a member movable by the vehicle truck and relatively to the vehicle body, a spring interposed between said member and the truck for transmitting relative movement to said member, and means for dampening the movement of said member.

4. A variable load brake including a member movable by the vehicle truck and relatively to the vehicle body, a spring interposed between said member and the truck for transmitting relative movement to said member, and a dash pot device for dampening the movement of said member.

5. A variable load brake including a member movable by the vehicle truck and relatively to the vehicle body, a piston operatively connected to said member, and a reservoir containing liquid and communicating with opposite sides of said piston.

6. A variable load brake including a member movable by the vehicle truck and relatively to the vehicle body, a casing movable with the truck and into which said member extends, and a spring in said casing and engaging said member.

In testimony whereof I have hereunto set my hand.

CLYDE C. FARMER.